United States Patent Office 3,152,095
Patented Oct. 6, 1964

3,152,095
MIXED NORMAL SALTS OF MALEIC ACID AND THEIR CATALYTIC USE IN AMINOPLAST RESIN COMPOSITIONS
Frederick E. Tropp and Ray T. Corkum, Bridgeville, Pa., assignors to American Cyanamid Company, New York, N.Y., a corporation of Maine
No Drawing. Filed Mar. 28, 1961, Ser. No. 98,768
24 Claims. (Cl. 260—21)

This invention relates to a novel composition comprising a thermosetting aminoplast resin and a catalytic quantity of a mixed normal salt of maleic acid wherein one of the carboxyl groups of said acid is neutralized with triethylamine and the other carboxyl group is neutralized with an amine selected from the group consisting of 2-dimethylaminoisobutanol, triethylenediamine, 1,2-bis-(dimethylamino)-ethane, 1-amino-3-dimethylaminopropane and 1-dimethylamino-2-hydroxypropane. Still further this invention relates to novel compositions of matter comprising a blend of a thermosetting aminoplast resin and a glyceride oil modified alkyd resin catalyzed with said mixed normal salt of maleic acid. Still further this invention relates to a group of certain mixed normal salts of maleic acid.

One of the objects of the present invention is to produce a catalyzed aminoplast resin composition which will have utility principally in the field of surface coatings. A further object of the present invention is to produce a composition of matter comprising a blend of a thermosetting aminoplast resin and a glyceride oil modified alkyd resin catalyzed with certain mixed normal salts of maleic acid. These and other objects of the present invention will be discussed in greater detail hereinbelow.

Thermosetting aminoplast resins are well known in the art and are produced by reacting an aldehyde, and more specifically formaldehyde, with a compound containing a plurality of amino groups to which are attached aldehyde reactable hydrogen atoms thereby providing sites for alkylol groups which are then available for condensation to provide a thermosetting resinous composition. Among the many compounds containing the aforementioned amino groups are the amino-triazines and more particularly melamine, benzoguanamine, acetoguanamine and the like. Additionally, one may make use of the ureas such as urea per se, thiourea, ethylene urea and the like. These resinous compositions may be either alkylated or unalkylated depending upon the principal end use. When the end use of these aminoplast resins is to be in the surface coating field, it is generally desirable to utilize the alkylated aminoplast resins. On the other hand when the end use of the aminoplast resins of the present invention is to be in the molding or adhesive fields, it is generally preferred to utilize an unalkylated aminoplast resin. The aminotriazine resin compositions, particularly the alkylated triazine resins are disclosed in considerable detail in the U.S. Patent 2,197,357 wherein reaction conditions, mol ratios and the like are fully disclosed and said patent is incorporated herein by reference in order to avoid redundant repetition of facets of the art already well known. The urea resins both alkylated and non-alkylated are even older in the art than the aminotriazine resins and therefore it is deemed to be unnecessary to repeat details with respect to the preparation of said resins where said details are already well known in the art. These aminoplast resins may be used as the sole resinous composition or they may be blended with glyceride oil modified alkyd resins particularly for coating resin purposes and said class of blended compositions is disclosed in considerable detail in the U.S. Patent 2,218,474 which is also incorporated herein by reference. The essence of the instant invention resides in a group of mixed normal salts of maleic acid having the following structural formula:

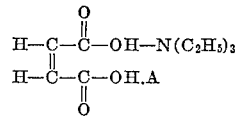

wherein A is a member selected from the group consisting of 2-dimethylaminoisobutanol, triethylenediamine, 1,2-bis(dimethylamino)-ethane, 1-amino-3-dimethylaminopropane and 1-dimethylamino-2-hydroxypropane. A further part of the essence of the present invention resides in a thermosetting aminoplast resin composition catalyzed with relatively small amounts of mixed normal salts.

In the preparation of the mixed normal salts of the present invention, it is preferred to accomplish the production of these salts by reacting maleic acid on a substantially mol for mol basis with triethylamine until the triethylamino mono-salt of maleic acid is produced. Thereupon said mono-salt is reacted on a substantially mol for mol basis with any one of the amino compounds set forth as A hereinabove. In each of these instances, the amine represented by A attaches itself to the remaining carboxyl group of the maleic acid through its nitrogen atom, and in the instance of a plurality of nitrogen atoms through one of its nitrogen atoms. This mechanism is well known in the art and the hydrogen of the carboxyl group becomes labile and shifts to the nitrogen atom which attaches itself to said carboxyl group. The resultant compounds are full, mixed normal disalts of maleic acid and are essentially neutralized or slightly basic when tested by adding water to the salts and checking the pH. The mono-salt of maleic acid and triethylamine is acidic and registers a pH of about 4.9. The full salts have the following pH values:

The mixed salt containing the triethylenediamine has a pH of 7.7.

The mixed salt containing the 1,2-bis(dimethylamino)-ethane has a pH of 7.5.

The mixed salt containing 2-dimethylamino-isobutanol has a pH of 9.2.

The mixed salt containing the 1-amino-3-dimethyl-aminopropane has a pH of 8.4.

The mixed salt containing the 1-dimethylamino-2-hydropane has a pH value of about 8.8.

The above procedure could be reversed if desired by reacting one of the amines represented by A with maleic acid in a substantially mol for mol basis to produce the mono-salt followed by the reaction of said mono-salt with the triethylamine on a substantially mol for mol basis thus producing the mixed disalt. It is considered undesirable to react the two different amines simultaneously with the maleic acid inasmuch as one runs the risk of producing a mixture of a mixed normal disalt, and two different unmixed normal disalts. In order to achieve the production of the mono-salt of maleic acid in substantially complete conversions, the first amine added may be charged to the reaction vessel in comparatively small increments until a total of substantially one mol of amine is added per mol of maleic acid in the system. This will result in substantially complete conversion of the maleic acid to the mono-salt and will avoid production of some mono-salt, some disalt and some unreacted maleic acid. When the mono-salt of triethylamine and maleic acid has been produced, the second different amine may then be added. The addition of the second amine need not be accomplished in increments for the purpose of avoiding any undesirable side products, but it is preferred that such addition be accomplished incrementally for the purpose of temperature control. In the production of these monosalts and subsequently the mixed normal salts, room temperatures are preferred. More specifically, one may use temperatures varying between about 20° C. and 40° C. and preferably 25° C. and 35° C. If desired, the maleic acid, a normally solid material may be added to the triethylamine, a normally liquid material, without benefit of any diluent. The resultant mono-salt may then be further neutralized with any one of the aforementioned different amines.

In certain instances it may be desirable to utilize a solvent for the maleic acid but one must choose a solvent that is inert to the maleic acid and to the amine under the conditions of reaction. Water may be used as the inert solvent but may have certain shortcomings for this purpose particularly if the ultimate mixed salt is to be used in a water-insoluble aminoplast resin composition, as in this instance, the aqueous diluent should be removed. To avoid the necessity of removing the solvent, one may utilize solvents that are compatible with the water-insoluble aminoplast resins such as the organic solvents including the lower aliphatic alcohols such as methanol, ethanol, propanol, butanol and the like. Additionally one can utilize the hydrocarbon solvents such as benzene, toluene, xylene and the like and the aliphatic hydrocarbon solvents such as pentane, hexane and the like. In order that the concept of the present invention will be more completely understood with respect to the preparation of the mixed normal salts, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

PREPARATION OF THE MONO-SALT OF TRIETHYLAMINE AND MALEIC ACID

Into a suitable reaction vessel equipped with thermometer, stirrer and heating and/or cooling means there is introduced 100 parts of isobutanol and 116 parts of maleic acid. While controlling the temperature of the system at about 30° C.±5° the isobutanol and maleic acid were stirred so as to form a slurry. Thereupon there is added, in small increments over a period of about 1 hour, 100 parts of triethylamine. As the salt is formed, it goes into solution. A sample of the salt is extracted from solution and when dissolved in water has a pH of about 4.9. The mono-salt in solution is then divided into five equal parts for further processing.

Example 1

One portion of the salt solution from the preceding example is introduced into a suitable reaction vessel and there is added thereto 24 parts of 2-dimethylaminoisobutanol otherwise known as 2-dimethylamino-2-methyl-1-propanol. As before the temperature is controlled at about 30° C.±5° C. After thorough mixing the full mixed normal salt of maleic acid with triethylamine and 2-dimethylaminoisobutanol is formed.

Example 2

Example 1 is repeated in all details except that in place place of the 2-dimethylaminoisobutanol there is substituted 22.5 parts of triethylenediamine. The procedure of Example 1 is continued and there is produced the mixed normal salt of maleic acid with triethylamine and triethylenediamine.

Example 3

Example 1 is repeated in all details except that in the place of the 2-dimethylaminoisobutanol there is substituted an equivalent amount of 1,2-bis-(dimethylamino)-ethane otherwise known as N,N,N',N'-tetramethylethylenediamine. The resultant mixed normal salt is identified as the maleic acid salt of triethylamine and 1,2-bis(dimethylamine)-ethane.

Example 4

Example 1 is repeated in all details except that in the place of the 2-dimethylaminoisobutanol there is substituted 20.5 parts of 1-amino-3-dimethylaminopropane otherwise known as 3-dimethylaminopropylamine. There is produced a mixed normal salt of maleic acid with triethylene and 1-amino-3-dimethylaminopropane.

Example 5

Example 1 is repeated in all details except that in the place of the 2-dimethylaminoisobutanol there is substituted 20.5 parts of 1-dimethylamino-2-hydroxypropane otherwise known as N,N - dimethylisopropanolamine. There is thus produced the full mixed normal salt of maleic acid with triethylamine and 1-dimethylamino-2-hydroxypropane.

The mixed amine salts are used with the aminoplast resins in the usual catalytic quantities, that is, from about 1% to about 5% by weight based on the total weight of aminoplast resin solids. It is preferred to use between about 2% and 3% by weight of these amine salts, same basis.

In the preparation of the melamine formaldehyde resins it is generally desired to react between about 2 mols and 6 mols of formaldehyde per mole of melamine. For coating resin purposes the formaldehyde to melamine ratio may be varied between about 3:1 and 4.5:1. The urea formaldehyde resins are generally prepared by reacting from about 1.5 to 3.5 mols of formaldehyde per mol of urea and preferably from about 2 to 3 mols of formaldehyde per mol of urea. When alkylated aminoplast resins are desired one may utilize any one of the lower aliphatic monohydric alcohols such as methanol, ethanol, propanol, isopropanol, normal butanol, isobutyl alcohol, tertiary butyl alcohol and the like. The degree of alkylation will be controlled in part by a measure of methylolation in the resinous material. It is not imperative that the resin be as fully alkylated as it is methylolated, although full alkylation is desirable for certain purposes.

When desired alkyd resins may be added to the catalyzed aminoplast resins with or without a solvent diluent. These alkyd resins and the methods of preparing the same are well known in the art and have been disclosed in a plurality of published references such as patents and literature. An outstanding treatise on alkyd resins is to be found in "Organic Coating Technology," vol. 1, by Henry Flemming Payne, and particularly chapter 7 thereof entitled "Alkyd Resins." These alkyd resins are prepared by reacting a polycarboxylic acid with a polyhydric alcohol generally in the presence of a glyceride oil. Ordinarily the polycarboxylic acid is one which is free of any nonbenzenoid unsaturation such as pthatalic anhydride. The polyhydric alcohol is preferably glycerol although the glycols may be used, as well as the tetra and hexa hydric alcohols such as pentaerythritol and dipentaerythritol among others. When the dihydric alcohols are used they are preferably used with a polyhydric alcohol of higher functionality such as the pentaerythritols in order to give the polyhydric alcohol mixture an average functionality greater than 2.5. The glyceride oils are divided into three principal categories, namely, the non-drying, semi-drying and the drying glyceride oils. It is often conventional to make use of the fatty acids of glyceride oils and additionally mono-glycerides of said fatty acids. These glyceride oil modified alkyd resins may be short oil, medium oil or long oil alkyd resins. The amount of aminoplast resin to be blended with the alkyd resin may be varied from about 15% to about 40% by weight (solids basis) of the aminoplast resin and correspondingly from about 85% to about 60% by weight (solids) of the glyceride oil modified alkyd resin.

If the aminoplast resin is to be used for adhesive purposes no diluent is ordinarily used. When the catalyzed aminoplast resin to be used for molding purposes it is generally blended with a suitable filler such as alpha cellulose and converted to a molding powder by the conventional steps of drying, comminuting and compacting. When the aminoplast resins of the present invention are used as coating compositions it is frequently desirable to utilize an inert organic solvent of which a plurality are conventionally known in the art. The amount of the solvent to be added will depend in great measure upon the coloring matter such as pigment or dye used with the coating composition, if any, and the mode by which the coating will be applied to a substrate. For spray-coating purposes the viscosity of the coating composition should be substantially lower than is generally required for roller coating and brushing.

The following examples are illustrative of specific embodiments of the aminoplast resins and the alkyd resins of the present invention.

A MELAMINE-FORMALDEHYDE RESIN

|  | Parts |
|---|---|
| Melamine (1 mol) | 126 |
| Formalin (5 mols) (37% formaldehyde in water) (a commercially available product) | 405.5 |
| Isobutyl alcohol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially nonaqueous fraction and means is provided so that the former fraction may be drawn off if desirable. The fraction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of isobutyl alcohol are added gradually. When the reflux condensate is substantially anhydrous, the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e.g., xylene.

A UREA -FORMALDEHYDE RESIN 3370 parts of 37% formaldehyde solution were charged to a suitable reaction vessel and neutralized to pH 8.6 with 20% sodium hydroxide, and there were then added 6 parts of 85% phosphoric acid. The mixture was heated to 70° C. and 1200 parts of urea were added over a period of an hour. The mixture was then heated to 85° C. and held at that temperature for one hour. 1340 parts of butanol were added and the mixture heated to reflux and held for one hour at reflux. 1550 more parts of butanol were added and the mixture distilled with replacing feed of dry butanol until a batch temperature of 112° C. was reached. The batch was then vacuum concentrated at 90° C. to approximately 65% resin solids. This solution was diluted with xylene and butanol to give a final composition of 20% xylene, 30% butanol, and 50% resin solids.

ALKYD RESIN A 94 parts of glycerin, 148 parts of phthalic acid anhydride, and 120 parts of soya bean oil fatty acids are introduced into a suitable reaction chamber and are heated to about 210–230° C. until condensation is essentially complete. The resin has an acid number of 6–7 and a viscosity of $Z_1$ to $Z_3$ on the Gardner-Holdt scale at 25° C. when dissolved in an equal weight of xylene. The resin thus produced contains about 33 to 36% oil acids based on the total resin solids.

ALKYD RESIN B 148 parts by weight of phthalic acid anhydride, 98 parts of glycerin, and 98 parts of coconut oil fatty acids are introduced into a suitable reaction chamber and there heated gradually to about 210–230° C. and the mixture is held at this temperature until condensation is substantially complete and until an acid number of about 4–8 is reached. A solvent, such as xylene, is then added in a sufficient amount to adjust the solids content to about 60% whereupon the viscosity at 25° C. is about $Z_4$ to $Z_6$ on the Gardner-Holdt scale. The resin thus produced contains about 29–32% oil acids based on the total resin solids.

*Example 6*

A blend is prepared of 30 parts (solids) of the isobutylated melamine formaldehyde resin prepared hereinabove with 70 parts (solids) of alkyd resin A. The resin blend is cut with a 1:1 mixture of butanol and xylene to a 50% solids solution. 2.5% by weight, based on the solids weight of the melamine resin, of the mixed salt prepared according to Example 1 is added. The coating composition is pigmented with titanium dioxide and after thorough blending a film is drawn down on a steel panel and baked at 250° F. for 30 minutes. The resultant film is scratch resistant, glossy and hard and displays excellent adhesion to the metal. Furthermore the film thus produced is resistant to acetic acid, a 5% aqueous solution of sodium hydroxide and xylene.

*Example 7*

A blend is made of 25 parts of the urea formaldehyde resin prepared hereinabove and 75 parts of alkyd resin B (solids basis). The resin blend is cut with xylene to 60% solids and is catalyzed with 2% of the salt of Example 2. In order to produce a clear film no pigmentation was used. A film is drawn down on a glass plate and is baked at 210° F. for 60 minutes. The resulting coating is clear, water white, scratch resistant, glossy and hard and displays good adhesion to glass.

*Example 8*

Example 6 is repeated in substantially all details except that the catalyst in an amount of 2.5% is the salt of Example 3. The films produced on the metal substrate are comparable to those produced in Example 5.

*Example 9*

Example 7 is repeated in all details except that the catalyst used is the salt of Example 4 in an amount of 3%. The film was drawn down on a piece of sheet steel and when baked at 230° F. for 45 minutes the resultant film was scratch resistant, glossy, hard and resistant to solvents such as acetic acid, a 5% solution of sodium hydroxide and xylene.

*Example 10*

Example 6 is repeated in all details except that the catalyst is the salt of Example 5 in an amount approximating 2% by weight based on the weight of the melamine resin. The films produced are comparable to those produced in Examples 6 and 8.

The resinous compositions of the present invention not only display unusually good adhesion to metals but also display accelerated cure, high gloss and smooth surface appearance. 60° gloss readings are usually above 95. Furthermore the stability of the neat resin itself and the enamels formulated with it are particularly outstanding. Still further these resinous materials, when used as coatings, have good color retention, heat resistance and durability.

We claim:

1. A composition of matter comprising a thermosetting aminoplast resin and a catalytic quantity of a mixed normal salt of maleic acid wherein one of the carboxyl groups of said acid is neutralized with triethylamine and the other carboxyl group is neutralized with an amine selected from the group consisting of (A) 2-dimethylaminoisobutanol, (B) triethylenediamine, (C) 1,2-bis(dimethylamino)-ethane, (D) 1-amino-3-dimethylaminopropane and (E) 1-dimethylamino-2-hydroxypropane.

2. A composition of matter comprising a thermosetting melamine-formaldehyde resin and a catalytic quantity of a mixed normal salt of maleic acid wherein one of the carboxyl groups of said acid is neutralized with triethylamine and the other carboxyl groups is neutralized with an amine selected from the group consisting of (A) 2-dimethylaminoisobutanol, (B) triethylenediamine, (C) 1,2-bis(dimethylamino)-ethane, (D) 1-amino-3-dimethylaminopropane and (E) 1-dimethylamino-2-hydroxypropane.

3. A composition of matter comprising a thermosetting alkylated melamine-formaldehyde resin and a catalytic quantity of a mixed normal salt of maleic acid wherein one of the carboxyl groups of said acid is neutralized with triethylamine and the other carboxyl group is neutralized with an amine selected from the group consisting of (A) 2-dimethylaminoisobutanol, (B) triethylenediamine, (C) 1,2-bis(dimethylamine)-ethane, (D) 1-amino-3-dimethylaminopropane and (E) 1-dimethylamino-2-hydroxypropane.

4. A composition of matter comprising a thermosetting butylated melamine-formaldehyde resin and a catalytic quantity of a mixed normal salt of maleic acid wherein one of the carboxyl groups of said acid is neutralized with triethylamine and the other carboxyl group is neutralized with an amine selected from the group consisting of (A) 2-dimethylaminoisobutanol, (B) triethylenediamine, (C) 1,2-bis(dimethylamino)-ethane, (D) 1-amino-3-dimethylaminopropane and (E) 1-dimethylamino-2-hydroxypropane.

5. A composition of matter comprising a thermosetting isobutylated melamine-formaldehyde resin and a catalytic quantity of a mixed normal salt of maleic acid wherein one of the carboxyl groups of said acid is neutralized with triethylamine and the other carboxyl group is neutralized with an amine selected from the group consisting of (A) 2-dimethylaminoisobutanol, (B) triethylenediamine, (C) 1,2-bis(dimethylamino)-ethane, (D) 1-amino-3-dimethylaminopropane and (E) 1-dimethylamino-2-hydroxypropane.

6. A composition of matter comprising a thermosetting urea-formaldehyde resin and a catalytic quantity of a mixed normal salt of maleic acid wherein one of the carboxyl groups of said acid is neutralized with triethylamine and the other carboxyl group is neutralized with an amine selected from the group consisting of (A) 2-dimethylaminoisobutanol, (B) triethylenediamine, (C) 1,2-bis(dimethylamino)-ethane, (D) 1-amino-3-dimethylaminopropane and (E) 1-dimethylamino-2-hydroxypropane.

7. A composition of matter comprising a thermosetting alkylated urea-formaldehyde resin and a catalytic quantity of a mixed normal salt of maleic acid wherein one of the carboxyl groups of said acid is neutralized with triethylamine and the other carboxyl group is neutralized with an amine selected from the group consisting of (A) 2-dimethylaminoisobutanol, (B) triethylenediamine, (C) 1,2-bis(dimethylamino)-ethane, (D) 1-amino-3-dimethylaminopropane and (E) 1-dimethylamino-2-hydroxypropane.

8. A composition of matter comprising a thermosetting butylated urea-formaldehyde resin and a catalytic quantity of a mixed normal salt of maleic acid wherein one of the carboxyl groups of said acid is neutralized with triethylamine and the other carboxyl group is neutralized with an amine selected from the group consisting of (A) 2-dimethylaminoisobutanol, (B) triethylenediamine, (C) 1,2-bis(dimethylamino)-ethane, (D) 1-amino-3-dimethylaminopropane and (E) 1-dimethylamino-2-hydroxypropane.

9. A composition of matter comprising an aminoplast resin and a catalytic quantity of a mixed normal salt of maleic acid wherein one of the carboxyl groups of said acid is neutralized with triethylamine and the other carboxyl group is neutralized with 2-dimethylaminoisobutanol.

10. A composition of matter comprising a butylated melamine-formaldehyde resin and a catalytic quantity of a mixed normal salt of maleic acid wherein one of the carboxyl groups of said acid is neutralized with triethylamine and the other carboxyl group is neutralized with 2-dimethylaminoisobutanol.

11. A composition of matter comprising an isobutylated melamine-formaldehyde resin and a catalytic quantity of a mixed normal salt of maleic acid wherein one of the carboxyl groups of said acid is neutralized with triethylamine and the other carboxyl group is neutralized with 2-dimethylaminoisobutanol.

12. A composition of matter comprising from about 15% to about 40% by weight of a thermosetting amino plast resin and correspondingly from about 85% to about 60% by weight of a glyceride oil modified alkyd resin and a catalytic quantity of a mixed normal salt of maleic acid wherein one of the carboxyl groups of said acid is neutralized with triethylamine and the other carboxyl group is neutralized with an amine selected from the group consisting of (A) 2-dimethylaminoisobutanol, (B) triethylenediamine, (C) 1,2-bis(dimethylamino)-ethane, (D) 1-amino-3-dimethylaminopropane and (E) 1-dimethylamino-2-hydroxypropane.

13. A composition of matter comprising from about 15% to about 40% by weight of an isobutylated melamine-formaldehyde resin and correspondingly from about 85% to about 60% by weight of a glyceride oil modified alkyd resin and a catalytic quantity of a mixed normal salt of maleic acid wherein one of the carboxyl groups of said acid is neutralized with triethylamine and the other carboxyl group is neutralized with an amine selected from the group consisting of (A) 2-dimethylaminoisobutanol, (B) triethylenediamine, (C) 1,2-bis(dimethylamino)-ethane, (D) 1-amino-3-dimethylaminopropane and (E) 1-dimethylamino-2-hydroxypropane.

14. A composition of matter comprising from about 15% to about 40% by weight of an isobutylated melamine-formaldehyde resin and correspondingly from about 85% to about 60% by weight of a glyceride oil modified alkyd resin and a catalytic quantity of a mixed normal salt of maleic acid wherein one of the carboxyl groups of said acid is neutralized with triethylamine and the other carboxyl group is neutralized with 2-dimethylaminoisobutanol.

15. A composition of matter comprising from about 15% to about 40% by weight of an isobutylated melamine-formaldehyde resin and correspondingly from about 85% to about 60% by weight of a glyceride oil modified alkyd resin and a catalytic quantity of a mixed normal salt of maleic acid wherein one of the carboxyl groups of said acid is neutralized with triethylamine and the other carboxyl group is neutralized wth triethylenediamine.

16. A composition of matter comprising from about 15% to about 40% by weight of an isobutylated melamine-formaldehyde resin and correspondingly from about 85% to about 60% by weight of a glyceride oil modified alkyd resin and a catalytic quantity of a mixed normal salt of maleic acid wherein one of the carboxyl groups of said acid is neutralized with triethylamine and the other carboxyl group is neutralized with 1,2-bis(dimethylamino)-ethane.

17. A composition of matter comprising from about 15% to about 40% by weight of an isobutylated melamine-formaldehyde resin and correspondingly from about 85% to about 60% by weight of a glyceride oil modified alkyd resin and a catalytic quantity of a mixed normal salt of maleic acid wherein one of the carboxyl groups of said acid is neutralized with triethylamine and the other carboxyl group is neutralized with 1-amino-3-dimethylaminopropane.

18. A composition of matter comprising from about 15% to about 40% by weight of an isobutylated melamine-formaldehyde resin and correspondingly from about 85% to about 60% by weight of a glyceride oil modified alkyd resin and a catalytic quantity of a mixed normal salt of maleic acid wherein one of the carboxyl groups of said acid is neutralized with triethylamine and the other carboxyl group is neutralized with 1-dimethylamino-2-hydroxypropane.

19. A mixed normal salt of maleic acid wherein one of the carboxyl groups of said acid is neutralized with triethylamine and the other carboxyl group is neutralized with an amine selected from the group consisting of (A) 2-dimethylaminoisobutanol, (B) triethylenediamine, (C) 1,2-bis(dimethylamino)-ethane, (D) 1-amino-3-dimethylaminopropane and (E) 1-dimethylamino-2-hydroxypropane.

20. A mixed normal salt of maleic acid wherein one of the carboxyl groups of said acid is neutralized with triethylamine and the other carboxyl group is neutralized with 2-dimethylaminoisobutanol.

21. A mixed normal salt of maleic acid wherein one of the carboxyl groups of said acid is neutralized with triethylamine and the other carboxyl group is neutralized with triethylenediamine.

22. A mixed normal salt of maleic acid wherein one of the carboxyl groups of said acid is neutralized with triethylamine and the other carboxyl group is neutralized with 1,2-bis(dimethylamino)ethane.

23. A mixed normal salt of maleic acid wherein one of the carboxyl groups of said acid is neutralized with triethylamine and the other carboxyl group is neutralized with 1-amino-3-dimethylaminopropane.

24. A mixed normal salt of maleic acid wherein one of the carboxyl groups of said acid is neutralized with triethylamine and the other carboxyl group is neutralized with 1-dimethylamino-2-hydroxypropane.

References Cited in the file of this patent

UNITED STATES PATENTS

| | | |
|---|---|---|
| 2,739,981 | Szado et al. | Mar. 27, 1956 |
| 2,859,188 | Heider et al. | Nov. 4, 1958 |
| 2,868,833 | Szado et al. | Jan. 13, 1959 |
| 2,871,209 | Shelley | Jan. 27, 1959 |
| 2,916,467 | Williams et al. | Dec. 8, 1959 |
| 2,940,945 | Christenson et al. | June 14, 1960 |

UNITED STATES PATENT OFFICE
CERTIFICATE OF CORRECTION

Patent No. 3,152,095            October 6, 1964

Frederick E. Tropp et al.

It is hereby certified that error appears in the above numbered patent requiring correction and that the said Letters Patent should read as corrected below.

Column 2, lines 46 and 47, for "hydropane" read -- hydroxypropane --; column 4, line 75, after "resin" insert -- is --; column 7, line 9, for "groups" read -- group --.

Signed and sealed this 26th day of January 1965.

(SEAL)
Attest:

ERNEST W. SWIDER
Attesting Officer

EDWARD J. BRENNER
Commissioner of Patents